United States Patent Office 3,488,518
Patented Jan. 6, 1970

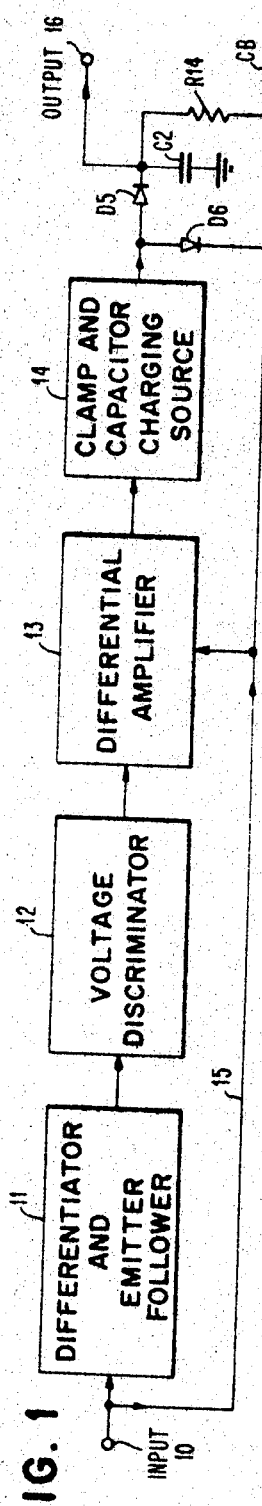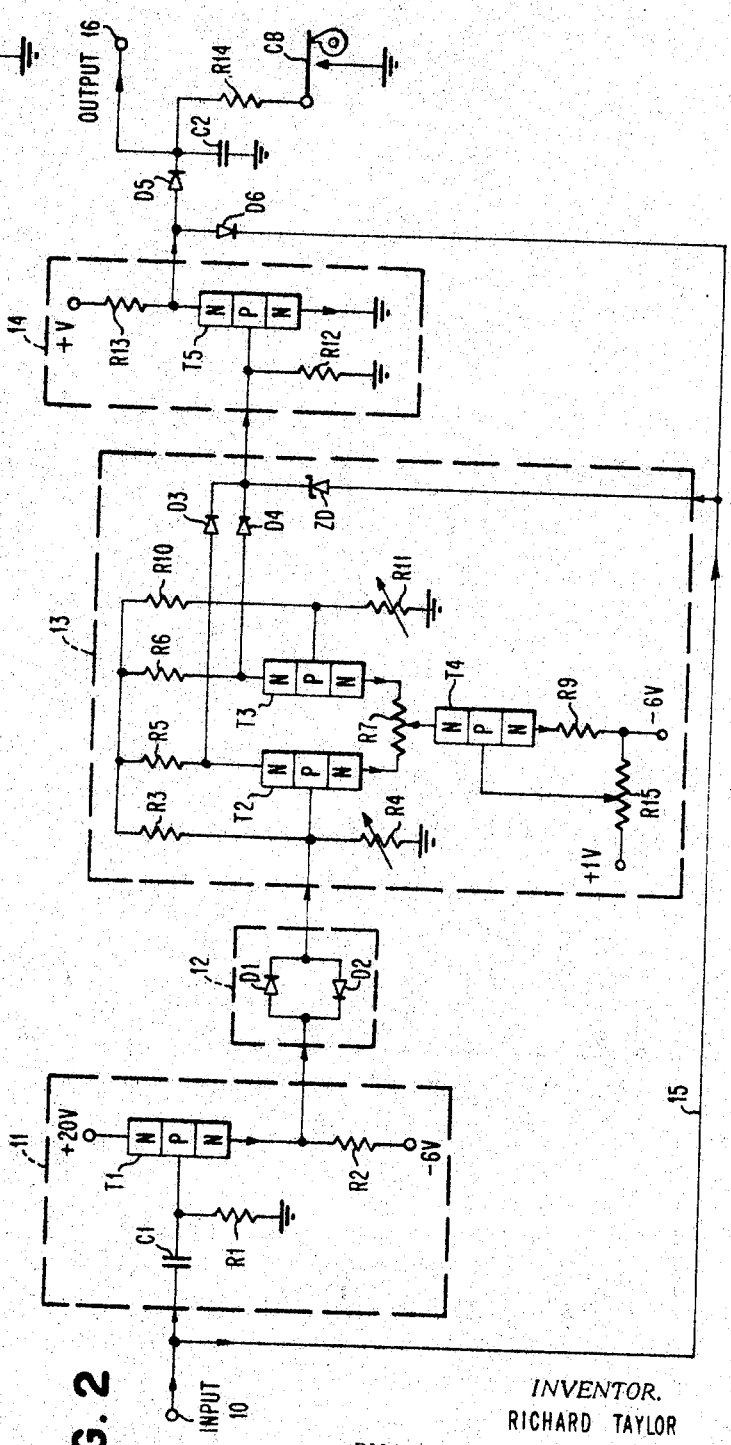

3,488,518
PEAK VOLTAGE STORAGE AND NOISE
ELIMINATING CIRCUIT
Richard Taylor, Yorktown Heights, N.Y., assignor to International Business Machines Corporation, Armonk, N.Y., a corporation of New York
Filed Dec. 13, 1965, Ser. No. 513,319
Int. Cl. H03k 17/16
U.S. Cl. 307—246                             2 Claims

ABSTRACT OF THE DISCLOSURE

A circuit which stores the peak value of an input electrical waveform which varies in magnitude as a function of time and prevents the storage of peak values of the input waveforms when the slope of the waveform exceeds a predetermined value. To this end, a capacitor and a charging means therefor for storing the peak value is provided. The charge on this capacitor is compared with the input waveform to prevent an addition to such charge when it exceeds the input waveform. A differentiating circuit is included for measuring the rate of change of the input waveform and means are included responsive to the differentiating circuit for preventing the capacitor from being charged when the rate of change of the input waveform exceeds a predetermined value.

---

This invention relates to a noise limiter and more particularly to a circuit for measuring and storing the peak amplitude of a slowly varying electrical waveform without storing noise spikes.

It is frequently necessary to record the peak amplitudes of a slowly varying electrical waveform which is subject to interference from noise which appears as sharp discontinuities, usually spikelike, in the smooth waveform. A particular example is the recording of the analysis of a blood sample by chromatographic examination of the blood following the addition of reagents thereto and dialysis. Automatic equipment for performing blood analyses yield an output in the form of a chart produced by a moving pen recorder. Visual examination of this printed record clearly reveals the smooth curve and the noise spikes, usually caused by bubbles in the stream of blood under analysis. In interpreting the results visually the skilled medical technician ignores the spikes and sets the peak values of the curve at the base of the spikes. If the automation is to include automatic recording of the peak values experienced by the recording pen in tracing the smooth blood analysis curve, means must be provided for performing the equivalent of the discretionary act of the technician. The invention, therefore, simply stated is a spike eliminator and peak value storage device. It is suited to operate with any time variant waveform upon which noise spikes may occur, but is most particularly suited to process waveforms representing the characteristics of a succession of blood samples as measured in an automatic blood analyzer.

It is therefore an object of this invention to provide an apparatus for storing the peak value of a time variant electrical waveform and for eliminating noise signals from the input waveform having a rate of change of signal strength in excess of a predetermined value, which value is greater than the rate of change of the noise-free time-variant electrical waveform.

A further object of this invention is to provide an apparatus for charging a capacitor to store the peak value of a time-variant electrical waveform by controlling a charging means for the capacitor to add voltage charge to the capacitor when the charge on the capacitor is less than the instantaneous voltage amplitude of the input waveform and the rate of change of the input waveform is less than a predetermined value.

Another object of this invention is to provide an apparatus for storing the peak value of an electrical waveform which varies with respect to time and for preventing the storage of peaks caused by violent excursions of the waveform, wherein there is provided means for charging a capacitor, means for preventing the capacitor charge from exceeding the voltage level of the input waveform and means responsive to rates of change of the input waveform in excess of predetermined values for preventing the means for charging the capacitor from charging the capacitor, whereby the capacitor will manifest the peak value of the input waveform shorn of violent excursions.

The foregoing and other objects, features and advantages of the invention will be apparent from the following more particular description of a preferred embodiment of the invention, as illustrated in the accompanying drawings.

In the drawings:

FIG. 1 is a functional block diagram illustrating the principle of the invention.

FIG. 2 is a detailed circuit diagram showing the circuits necessary to implement the functions ascribed to the blocks of FIG. 1.

In FIG. 1 there is shown a block diagram of the functional units which are implemented by the specific circuit elements shown in detail in FIG. 2. The slowly varying electrical waveform, including the noise spikes, enters at terminal 10 and is fed to the differentiating and emitter follower circuit 11, which circuit produces an output proportional to the rate of change of the time-variant voltage waveform applied to the input terminal 10, the emitter follower being provided to prevent undue input circuit loading. The voltage discriminator 12 operates to produce an output if the differentiator (and emitter follower) 11 exceeds a predetermined level indicating a rate of change of the input waveform manifestive of a noise spike. The differential amplifier 13 operates the clamp and current charging source 14 to permit charging current to enter the capacitor C2 so long as the voltage charge therein is less than that of the input, and if the rate-of-change of the input voltage does not exceed the predetermined amount. The clamp effectively places a ground potential at the junction of D1 and D2 to prevent charging of C2 when the differentiator 11 signals an excessive rate of change of the input voltage or when the input voltage waveform slope turns negative, indicating respectively that a noise spike has appeared at the input or that the waveform is descending from the peak. The input voltage from terminal 10 is fed through line 15 to the diode D1 to provide the reference voltage for controlling the charging action of capacitor C2. With this circuit arrangement, the capacitor C2 is charged from the current source 14 so long as the input waveform is increasing at a rate less than the predetermined rate. When the slope turns negative or a noise spike occurs the junction of D1 and D2 is clamped at ground level to prevent further charging of the capacitor. Thus the charge on capacitor C2 will follow all positive going excursions of the input waveform (except spikes) and will store the peak value of the input voltage (without spikes). This peak value storage is available at the output terminal 16, and is normally gated out just before the capacitor C2 is discharged through resistor R14 and cam controlled contacts CB1. These contacts are normally closed at regular intervals in an automatic blood tester in synchronism with the successive feeding of samples to the analyzer, allowance being made for the transit time of the blood from the sampling entry to the color analyzer.

Referring now to FIG. 2 which shows the detailed circuits of the functional blocks shown in FIG. 1, enclosed in dotted blocks bearing similar reference numerals to denote the corresponding functions, the input signal is applied to the terminal 10. This signal is preferably generated by a slide wire potentiometer attached to the pen animating mechanism of the chart recorder that records the output from an automatic blood analyzer. This input signal, however, may be any time variant waveform manifesting any succession of phenomena wherein it is desired to store and record successive peak values of the input waveform and eliminate noise spikes therefrom. The signal at the output terminal 16 is a voltage level representing the peak amplitude of the waveform (filtered of noise spikes) which has occurred during the sampling period, just before the contacts CB are closed to destroy the storage. This output voltage is subjected to an analog to digital conversion as recorded as a test result. By correlating the succession of recorded test results with the corresponding succession of sample inputs, the analysis of blood samples may be identified with the corresponding patient source.

The slowly increasing potential at the input terminal 10, so long as its positive slope does not exceed the pre-established value, controls the charging of capacitor C2 to follow the voltage increases of the input waveform. The charging circuit for capacitor proceeds from +V serially through resistor R13, diode D5, and capacitor C2 to ground so long as the voltage charge on the capacitor C2 does not exceed the input voltage on terminal 10 which is connected via line 15 to diode D6 which acts as a clamp to prevent further charging when the capacitor charge equals the input voltage signal. Thus, the capacitor C2 will follow all slowly increasing voltages at the input terminal. Capacitor C2 is a low leakage capacitor that will retain the charge representing the maximum input value until its output is recorded, and the capacitor discharged through CB and R14.

If a positive signal (as a result of a voltage in excess of +.3 volt from T1) is passed by D1 the base of T2 will be driven positive and the collector of T3 will be driven positive. The positive excursion of the collector of T3 is coupled through diode D4 to the base of T5, returned to ground via R12. As a result of this transistor T5 conducts lowering its collector potential to ground to stop the charge of capacitor C2 from resistor R13. Conversely if the input to the difference amplifier goes negative the base of T2 goes negative and its collector positive. The positive excursion of the collector is coupled via D4 to transistor T5 to turn it on and block the charging of capacitor C2. The negative blocking is necessary because the instantaneous voltage value of a noise spike occurring at the peak is greater than the peak voltage value. Thus, when the noise signal decays (negative slope), the charging of capacitor C2 must likewise the blocked. Thus, a bi-polar blocking circuit must be used. The collectors of T2 and T3 are normally adjusted to ground potential (in the absence of an input signal to difference amplifier 13) by adjustment of the current source provided by transistor T4 through adjustment of resistors R9 and R15.

If, for any reason, the recorder pen should be driven off scale and stop the voltage at the input, terminal 10 will persist at a high level. The differentiator circuit 11 will be inactive to prevent overcharge of capacitor C2. Therefore the Zener diode ZD is provided to go into forward bias at +10 v. to turn T5 on and stop further charging of C2. Negative off-scale excursions do not require this safeguard, as diode D6 provides the requisite clamp.

From the foregoing circuit explanation it will be apparent that the storage capacitor will follow and store all positive-going voltage excursions of the input waveform except those having an excessive rate of increase, and that the storage of voltages which are accompanied by an excessive rate of change, either positive or negative, will be prevented. Thus, at the end of the sampling period the capacitor will have stored the peak value of the input waveform shorn of noise spikes.

While the invention has been particularly shown and described with reference to a preferred embodiment thereof, it will be understood by those skilled in the art that the foregoing and other changes in form and details may be made therein without departing from the spirit and scope of the invention.

What is claimed:

1. Apparatus for storing the peak value of an input electrical waveform varying in amplitude as a function of time, and for preventing the storage of peak values of the waveform when the slope of the waveform exceeds a predetermined value comprising:
   (a) a storage capacitor for storing a voltage equal to the peak amplitude of the input waveform shorn of noise spikes;
   (b) a normally operative charging circuit for charging said capacitor;
   (c) means operative responsive to a voltage charge on said storage capacitor greater than the voltage level of said input waveform for rendering said charging circuit inoperative to add further charge to said storage capacitor;
   (d) a differentiator operable responsive to said input waveform to produce an output response manifestive of the rate of change of said input waveform;
   (e) a voltage discriminator connected to said differentiator and operable responsive to the output response therefrom to pass only signals in excess of predetermined positive and negative values;
   (f) a bi-polar amplifier operable responsive to the signals passed by said voltage discriminator to produce an inhibiting output upon the occurrence of these signals;
   (g) and a clamp operable responsive to said inhibiting output to render said charging circuit inoperative to add further charge to said storage capacitor.

2. The apparatus of claim 1 wherein the means responsive to excessive rates of change of the input waveform for preventing said charging means from charging the storage capacitor when the rate of change exceeds a predetermined value comprising:
   (a) a voltage discriminator connected to the output of said emitter follower transistor circuit and operable to pass positive and negative voltage levels in excess of a predetermined value;
   (b) a dual polarity amplifier operable to produce a positive output signal in response to positive and negative input signals from said voltage discriminator;
   (c) and a transistor circuit operable responsive to said output signal to switch from a non-conductive to a conductive state to apply a ground potential to the junction between the resistor and the diode in said serial charging circuit to divert the charging current from said storage capacitor, the said last-named transistor circuit being connected with its emitter to ground, its base to said signal, and its collector to said junction.

References Cited

UNITED STATES PATENTS

| | | | |
|---|---|---|---|
| 2,448,718 | 9/1948 | Koulicovitch | 328—135 |
| 2,496,909 | 2/1950 | Eberhard | 328—117 |
| 2,511,564 | 6/1950 | Callan | 328—127 |
| 2,524,776 | 10/1950 | Deloraine | 328—127 |
| 2,534,264 | 12/1950 | Hoeppner | 328—117 |
| 2,820,895 | 1/1958 | Johnstone | 328—117 |
| 2,834,883 | 5/1958 | Lukoff | 328—151 |
| 3,128,435 | 4/1964 | Mleezko et al. | 328—151 |
| 3,235,807 | 2/1966 | Appel | 328—116 |

JOHN S. HEYMAN, Primary Examiner

H. A. DIXON, Assistant Examiner

U.S. Cl. X.R.

307—235; 328—165